Jan. 25, 1955   H. L. LESIGNE ET AL   2,700,702
CONTROL DEVICE FOR THE SETTING OF SELECTORS
Filed March 28, 1951   3 Sheets-Sheet 1

INVENTORS
HENRI LOUIS LESIGNE
YVES RIOU
By Adams & Bush
ATTORNEYS

INVENTORS
HENRI LOUIS LESIGNE
YVES RIOU
BY Adams & Bush
ATTORNEYS

United States Patent Office 2,700,702
Patented Jan. 25, 1955

2,700,702

CONTROL DEVICE FOR THE SETTING OF SELECTORS

Henri Louis Lesigne, Vanves, and Yves Riou, Paris, France, assignors to Compagnie Generale d'Electricite, Paris, France, a corporation of France Application March 28, 1951, Serial No. 217,972

Claims priority, application Switzerland May 27, 1946

4 Claims. (Cl. 179—18)

The present application is a continuation in part of our co-pending application Ser. No. 700,882, filed October 3, 1946 and now abandoned.

The present invention relates to the control of the setting of selectors employed in remote control and telecommunication.

It is particularly applicable to the case in which the establishment of a circuit requires the setting of several successive selectors.

In particular, in the case in which the selectors are employed for the establishment of a telephone or telegraph connection, it permits of a modification of the route followed by the connection in a very simple manner, this modification being controllable either manually or automatically, by means of a device such as that which is the object of Patent 2,522,758.

In U. S. Patent 2,529,166 a system has been described for the automatic establishment of communications, wherein the various selections which allow of attaining the desired control by successive passage through a certain number of selectors, are controlled by a control device termed a recorder. This recorder is provided especially for the purpose of controlling the rotation of the selectors until the latter reach the position corresponding to the direction desired; the recorder receives a report back of the passage of each selector over this position by the closing of a circuit, when one selector brush reaches a contact connected to a wire characteristic of the direction desired, this being termed a control wire, and each of these wires controls a single selection stage.

One feature of the present invention consists in the simultaneous use of a control wire common to at least two successive stages of selection. Another feature consists in an additional wire, which, when it is connected to a contact on which a selector has just stopped, at any stage of selection, closes the circuit of a relay, the effect of which is to indicate back to the recorder that the selection is not to be terminated at that stage, but must be continued in the following stages, or conversely.

In particular this relay may be situated in the recorder, and its closing circuit may have one part in common with the control circuit.

Thus, a given selection being placed under the control of a single control wire, in the case in which for example the different circuits corresponding to one direction are engaged, it is sufficient to change the control wire to reach the desired direction by a diverted route without modifying the recorder in any way.

The accompanying drawings represent, by way of example the application of the present invention to the selection of telephone communication circuits.

Figure 6:
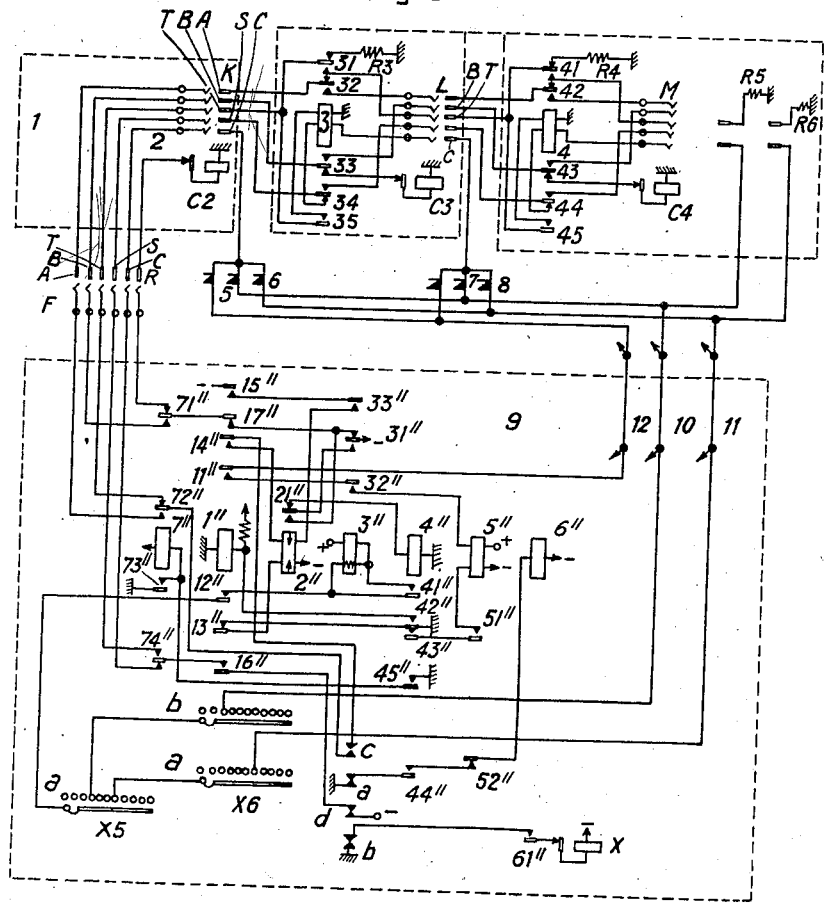

Fig. 6 gives an example of the combination of the means employed in the recorder for obtaining continuous selection when the additional wire is connected to the selector at the position across which the latter has just stopped.

Figure 7:
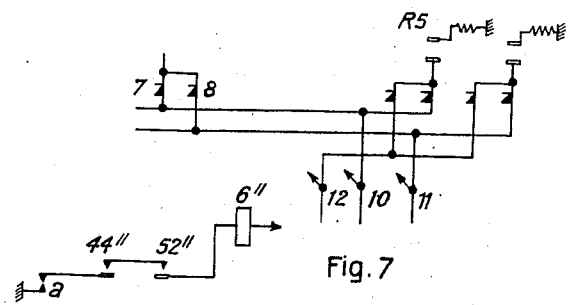

Fig. 7 shows a modification of Fig. 6.

Figure 1:
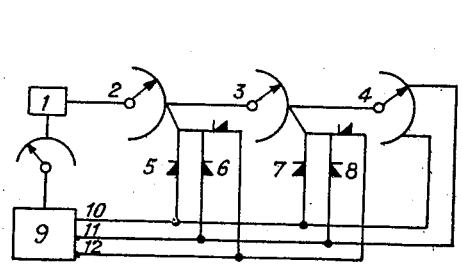
Fig. 1 shows the arrangement of the control wires and Fig. 2 is a schematic drawing of the route-diverting device.

Fig. 1 represents a circuit comprising a connection circuit 1, associated with successive selectors 2, 3 and 4.

The recorder 9 which is associated with a connection circuit 1 while the communication is being established ensures the setting of the selectors by means of the control wires 10 or 11, and the additional wire 12.

The arrangement represented permits the use of two routes having a common wire through first and second selectors 2 and 3, and differing only by the position of third selector 4.

Under these conditions, the two control wires 10 and 11, each corresponding to one of these routes, terminate at different points on the third selector 4. On the other hand, since selectors 2 and 3 have to assume the same position whatever may be the point of termination of the route followed, control wires 10 and 11 end at the same point on these selectors. Rectifiers 5 and 6 appropriately oriented, prevent the establishment of common points or a short circuit between wires 10 and 11. Moreover, since selection continues over and beyond first and second selectors 2 and 3, an additional wire 12 is connected, on selectors 2 and 3, to the two points where the control wires 10 and 11 terminate. The selection ends at third selector 4, and additional wire 12 therefore is not connected to this third selector 4; thus the recorder 9 is advised that it may pass to the following position either to carry out a new selection to another control wire, or to connect with a subscriber.

Figure 3:
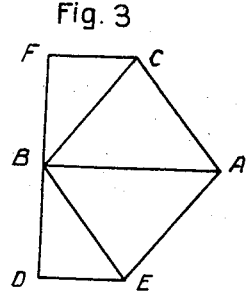
Fig. 3 depicts an example of a network in which certain stations may be reached by several routes.

Considering now the network shown in Fig. 3, it will be seen that a communication proceeding from point A and intended for point F, may be routed normally through the path ABF. However, it may become necessary temporarily to abandon the path ABF and to take the path ACF while retaining the normal path AB for communications intended for B.

Figure 2:
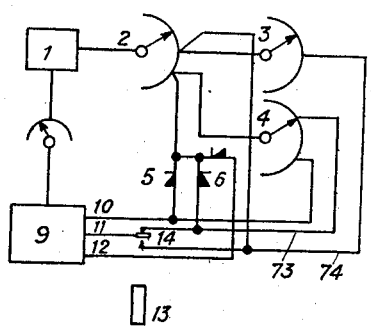

This result may be attained very simply by adopting at point A of Fig. 3, the arrangement shown in Fig. 2.

In this Fig. 2, 1 represents a connection circuit associated with a first-stage selector 2 to switch the communication towards first second-stage selector 3 or to second second-stage selector 4 according to the direction designated by the recorder 9 under the control of control wires 10 and 11.

In the example under consideration, it is assumed that control wire 10 of Fig. 2 corresponds to the direction of point B of Fig. 3, and that wire 11 corresponds to the direction of point F of Fig. 3.

When the desired direction is point B, the recorder will ensure the proper setting of first selector 2 and then of second-stage selector 4 through control wire 10, whatever may be the position of the diverting relay 13 having a controlled contact 14. On the other hand, when the desired direction is point F, the recorder 9 will ensure the setting of the selectors by means of control wire 11. In the case in which the diverting relay 13 is at rest, first selector 2 is set towards selector 4, and third selector 4 in its turn is set by branch 73 of control wire 11.

If relay 13 has been energized, first selector 2, because of the same control wire 11, is set towards second selector 3, and the latter in its turn is set by branch 74 of control wire 11.

To effect diversion it is sufficient to actuate the reversing contact 14 of relay 13.

In Fig. 2, no means have been shown for actuating relay 13. Such means will be described below in connection with Figs. 4 and 5.

Figure 4:
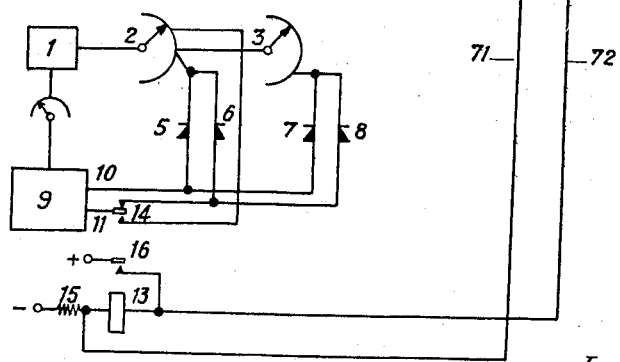
Fig. 4 shows an arrangement for obtaining a diversion of route and controlled automatically by means of a traffic control device.

In particular, Fig. 4 represents an example of the application of an automatic device with a traffic-control arrangement such as that described in U. S. Patent 2,522,758.

In this patent a device is described by the use of which it is always possible to know the number of engaged circuits in a group, and especially to know at what moment a given number of circuits are simultaneously engaged.

In Fig. 4 there is shown a switching apparatus which forms part of this arrangement and which has twenty different positions, positions 14 and 18 having been numbered.

It may also be assumed, by way of example, that diversion will occur as soon as eighteen circuits out of twenty are engaged, and that the normal channel will again be used as soon as only thirteen circuits are engaged.

For this purpose the switching apparatus comprises two rows of twenty contact studs, only the contact studs of the lower row having been represented. The contact studs of the upper row are strapped and grounded. Contact studs 1 to 14 of the lower row are strapped and connected to a wire 71, whereas contact studs 18 to 20 are strapped and connected to a wire 72. Through the arrangement described in U. S. Patent 2,522,758 two coupled brushes hunting over the two rows respectively occupy the position whose number is equal to the number of the busy circuits. For instance, they occupy position 10 for 10 busy circuits.

As in the preceding figures, in Fig. 4, 1 represents a connection circuit associated with a first selector 2 and a secondary selector 3. These two selectors are set by recorder 9 by means of control wires 10 and 11.

When the number received by the recorder 9 necessitates a setting in the direction characterized by wire 11, and when the number of circuits engaged is such that route diversion is not necessary, control wire 11 is connected to a position corresponding to the normal route by means of contact 14 of relay 13 in an unactuated condition. When eighteen of the twenty circuits are engaged, the brushes of the switching apparatus of the control device come to one of the positions 18, 19 or 20 shown at the right end of the bank of contacts, according to the number of circuits engaged. Relay 13 is then energized by means of the following circuit:

The positive battery terminal, contact 18 of the bank of the rotary switch at position 18, 19 or 20, the winding of relay 13, resistance 15 and the negative battery terminal.

Relay 13 then closes a holding circuit as follows:

The positive battery terminal, contact 16 of relay 13 in operative condition, the coil of relay 13, resistance 15 and the negative battery terminal.

Contact 14 of relay 13 is then in the operated position and control wire 11 is connected through the selector 2 to the position which corresponds to the desired direction of diversion. When the number of engaged circuits becomes equal to or lower than 14, the brushes of the switching apparatus come into the position corresponding to the number of engaged circuits. Relay 13 is short-circuited and is de-energized as follows:

The positive battery terminal, a contact of the switching apparatus in a position between 0 and 14 inclusively, the coil of relay 13, contact 16 of relay 13 in operated condition and the negative battery terminal.

Control wire 11 is thus again connected to the position characteristic of the normal route.

Figure 5:
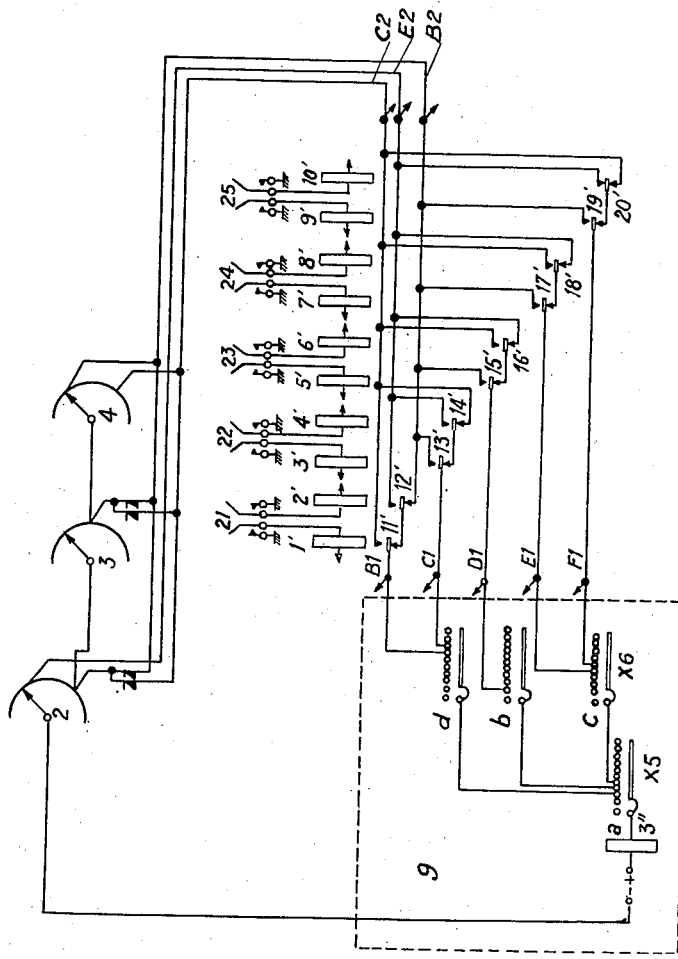
Fig. 5 shows an arrangement of diverting relays applied to the case of the network of Fig. 3.

Fig. 5 is a complete schematic diagram of the switching system to be applied at point A of the network of Fig. 3 to obtain a number of different route diversions.

X5 is a tens digit switch having a bank of contacts $a$ and X6 is a units digit switch having three banks of contacts $b$, $c$, and $d$; 3" is a control relay. All these members are within a rectangle 9 shown in broken lines. These members and this rectangle are also shown in Fig. 6.

In Fig. 5, $B_1$, $C_1$, $D_1$, $E_1$, and $F_1$ represent control wires proceeding from the recorders and characterizing the point to which the communication is to be sent. $B_2$, $C_2$, and $E_2$, are control wires directed towards the selectors and allowing of stopping the latter in positions corresponding to the directions of B, C or E of Fig. 3.

Under these conditions, examination of Fig. 5 will show that with relay contacts in the unactuated position, which is that shown in the figure, wire $B_1$ is connected to wire $B_2$, wire $C_1$ to wire $C_2$ and wire $E_1$ to wire $E_2$. Points B, C or E will thus be reached directly.

In the same way, wire $D_1$ is connected to wire $E_2$ in such manner as to reach point D by passing in transit through point E of Fig. 3.

For the same reason, point F will be reached by transit through point C.

Likewise there are shown, at 1', 2', 3', 4', 5', 6', 7', 9', and 10', relays for effecting diversions from the routes mentioned above. These relays are operated by keys 21, 22, 23, 24 and 25. Relay 1' has controlled contact 11'. Relay 2 has controlled contact 12', and so on to relay 10', having controlled contact 20', the controlled contact of each relay appearing in a vertical column beneath the representation of its winding.

For example, in order to reach point D, it may be necessary to pass through point B and not through point E of Fig. 3.

It will be sufficient for this purpose to move key 23 to the left.

Relay 5' is then energized, and by means of its controlled contact 15', it disconnects wire $D_1$ from wire $E_2$ and connects it to wire $B_2$. As from that instant, all communications intended for point D will pass through point B. In the same way, by moving key 23 to the right, relay 6' will be energized, and by means of its controlled contact 16', wire $D_1$ is connected to wire $C_2$. Communications intended for D will then pass through point C of Fig. 3.

Relays such as relays 1' to 10' of Fig. 5 may likewise be operated both by a key and by an automatic route diversion device, which allows both manual and automatic regulation of the network.

Thus if in the network of Fig. 3, the line between points E and D is unusuable, relay 5' of Fig. 5 is actuated as from point E by means of a remote control device. Communications normally passing from point A to point D through E will, owing to this fact, be taken through point B.

Finally, Fig. 6 shows an example of the combination of means employed in the register-controller to obtain continuous selection when the additional wire is connected to the control wire.

In this figure, 1" shows the rotary relay, 2" the test relay, 3" the control relay, 4" the connection relay, 5" the selection-dividing relay, and 6" the terminal-selection relay. The selectors K, L and M correspond to those designated in Fig. 1 by 2, 3 and 4 respectively.

The manner of operation of the apparatus is as follows:

When a register becomes connected to a calling subscriber relay 1" is energized.

When the subscriber has dialled the digits 3 and 2 for instance, the digit switches X5 and X6 are in position 3 and 2 respectively.

The selector K (Figure 6) is operated by the drive circuit: earth, C2, contact and wiper R, contacts 71", 17", 31" and battery. When the selector 2 reaches the required position, the relay 3" is operated by the control circuit: isolated battery +, 3", 12", contact 3 of X5, contact $b2$ of X6, wire 10, rectifier 5, C— contact of selector K, contact and wiper C of finder F, 74", 16" and contact $d$ of the sequence-switch X to the — pole of the isolated battery. If the outlet is disengaged the relay 2", whose first winding has been energized by the closing of 13", falls back, because its second winding is energized by the circuit: earth, resistance R3, 31, T contacts and wipers of the selector 2 and register-finder, 72", contact C of the sequence switch, 14", relay 2", 33", 15" and battery.

At the same time, the relay 5" is operated by the circuit: + pole of the isolated battery, upper winding of 5", 32", 11", wire 12, C— contacts and wipers of K and F, 74", 16", and contact $d$ to the — pole of the isolated battery. The excitation of the relay 5" indicates to the register-controller that the required trunk has not yet been reached; 4" is excited through the contacts 21" and 31"; 5" is held by the closing of contact 43"; 7" is operated by the closing of 45" and closes its own holding circuit; 1" falls back because it is short-circuited at 42"; 3" falls back because its circuit is broken at 12" and breaks the circuit of 4" at 31"; 5" then falls back because its circuit is broken at 32" and 43".

On its release, 4" removes the short-circuit at 42" so so that the relay 1" is re-operated and operates the selector L by the circuit: C3, 33, contacts and wipers B of K and F, 71", 17", 31" and battery. The lower winding of the relay 2" is excited over contact 13". When the selector reaches a disengaged outlet in the group, the relay 3" is operated by the circuit: + pole of the isolated battery, winding of 3, 12", contact $a^3$ of X5, $b^2$ of X6, wire 10, rectifier 7, contact and wiper C of selector L, relay 3, contact 34, contacts and wipers S of the selector K and finder F, contacts 74" and 16" and contact $d$ of sequence-switch to the — pole of the isolated battery.

The relay 3 of the selector is so adjusted that it cannot operate in series with 3". If the line is free, the relay 2" falls back because its second winding is excited by the circuit: earth, resistance R4, contact 41, contact and wiper T, contact 32, contact and wiper A, 72", contact C of the sequence-switch, contact 14", relay 2", contacts 33", 15" and battery.

At the same time, the relay 5" is excited by the circuit: + pole of the isolated battery, 5", 32", 11", wire 12, contact and wiper C of the selector L, relay 3, contact 34, contacts and wipers S, 74", 16" and contact d of sequence-switch, − pole of the isolated battery.

The operation of the relay 5" indicates to the register-controller that the required junction has not been reached; the relay 4" is excited over contacts 21" and 31"; and 5" is held over 43" while the relay 3 of the selector L operates, the latter because 4" short-circuits the second winding of 3" at 41" so that the intensity of energisation of 3 is increased sufficiently to operate it. The relay 1" is short-circuited at 42" so that it falls back and by its contact 12" causes the release of 3" which falls back, thereby releasing 4"; 5" falls back because its circuit is broken at 32" and 43", and 4" by removing the short circuit at 42" causes the relay 1" to be reoperated so that it operates the selector M by the circuit: earth, C4, 43, contact and wiper B, 33, contacts and wipers B, 71", 17", 31" and battery. The relay 3" is re-operated when the selector M reaches the lines marked by the wire 10 or 11 and, when the selector reaches a disengaged line, the relay 3 is excited and the operation continues in a way similar to what has previously been described. The wire 12 is not connected to the selector M and the relay 5" does not function. The relay 4" operates, 6" is excited through contact a of the sequence switch X, 44" and 52"; the sequence switch is advanced by the closing of 61"'; the various relays are released.

Resistances R5 and R6 correspond to the two positions of selector 4 of Fig. 1 where terminate wires 10 and 11 respectively.

In the modification shown by Fig. 7, the additional wire 12 is connected to the terminals of the last selection stage instead of the stages preceding it. Its function is then to provide for the progress of sequence switch X. The back contact 52" of Fig. 6 is then replaced by the front contact 52" of Fig. 7. Nothing else is modified in Fig. 6.

We claim:

1. In a telecommunication switching system: first-stage selectors having control terminals; second-stage selectors having control terminals, each first-stage selector having access to each second-stage selector; a register containing a digit switch having contacts and a sequence switch having an energizing circuit: a control wire connected at one end on a contact of said digit switch and dividing into two branches, one of which is multipled on one of said control terminals of each of said first-stage selectors and the other of which is multipled on one of said control terminals of each of said second-stage selectors; an additional wire multipled on said control terminal of selectors of the same stage on which one branch of said control wire is multipled, means for closing a circuit passing over said additional wire when one of the selectors of said stage stands on said control terminal, and means for causing the closing of said circuit to control said energizing circuit of said sequence switch.

2. In a telecommunication switching system: first-stage selectors having control terminals; second-stage selectors having control terminals, each first-stage selector having access to each second-stage selector; a register containing a digit switch having contacts; a first wire connected to a contact of said digit switch; a second wire dividing into two branches, one of which is multipled on one of said control terminals of each of said first-stage selectors and the other of which is multipled on one of said control terminals of each of said second-stage selectors to which has access said control terminal of said first-stage selector on which said first branch of said second wire is connected; a third wire dividing into two branches, one of which is multipled on one of said control terminals of each of said first-stage selectors different from the control terminal on which is multipled said first branch of said second wire and the other of which is multipled on one of said control terminals of the second-stage selectors to which has access said control terminal of said first-stage selector on which said first branch of said third wire is connected; a contact member mounted on each of said three wires, and means for contacting said contact member of said first wire with said contact member of either said second or said third wire.

3. A telecommunication switching system according to claim 1 in which said means consists of a contact of a relay.

4. A telecommunication switching system according to claim 2 comprising means controlled by the traffic load on the different outgoing trunks for actuating said relay.

References Cited in the file of this patent

UNITED STATES PATENTS

| | | |
|---|---|---|
| 1,857,833 | Baker | May 10, 1932 |
| 1,912,122 | Beale | May 30, 1933 |
| 2,431,313 | Den Hertog | Nov. 25, 1947 |